(12) United States Patent
Furuta et al.

(10) Patent No.: US 10,593,353 B2
(45) Date of Patent: Mar. 17, 2020

(54) PRESSURE-SENSITIVE ADHESIVE SHEET AND MAGNETIC DISC DEVICE

(71) Applicant: Nitto Denko Corporation, Ibaraki-shi, Osaka (JP)

(72) Inventors: Kenji Furuta, Ibaraki (JP); Akira Hirao, Ibaraki (JP); Tatsuya Suzuki, Ibaraki (JP); Hiroki Ieda, Ibaraki (JP); Akira Chinen, Ibaraki (JP); Minami Watanabe, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 16/223,800

(22) Filed: Dec. 18, 2018

(65) Prior Publication Data

US 2019/0206427 A1 Jul. 4, 2019

(30) Foreign Application Priority Data

Dec. 28, 2017 (JP) .................................. 2017-253955
May 14, 2018 (JP) .................................. 2018-093149

(51) Int. Cl.
*G11B 5/012* (2006.01)
*C09J 7/38* (2018.01)
*G11B 5/127* (2006.01)
*G11B 19/20* (2006.01)

(52) U.S. Cl.
CPC .............. *G11B 5/012* (2013.01); *C09J 7/387* (2018.01); *G11B 5/127* (2013.01); *G11B 19/2009* (2013.01); *C09J 2203/326* (2013.01); *C09J 2205/114* (2013.01); *C09J 2425/00* (2013.01); *C09J 2453/00* (2013.01)

(58) Field of Classification Search
None
See application file for complete search history.

(56) References Cited

U.S. PATENT DOCUMENTS

| | | | | |
|---|---|---|---|---|
| 9,644,117 | B2 * | 5/2017 | Meincke | C09K 9/02 |
| 2001/0055678 | A1 * | 12/2001 | Murata | C09J 7/38 |
| | | | | 428/346 |
| 2008/0233394 | A1 * | 9/2008 | Domanski | C09J 7/26 |
| | | | | 428/352 |
| 2010/0183872 | A1 * | 7/2010 | Nonaka | C09J 133/066 |
| | | | | 428/336 |
| 2011/0008605 | A1 * | 1/2011 | Suzuki | C09J 7/21 |
| | | | | 428/220 |
| 2011/0059281 | A1 * | 3/2011 | Wada | C09J 7/21 |
| | | | | 428/41.8 |

(Continued)

FOREIGN PATENT DOCUMENTS

| | | |
|---|---|---|
| JP | 2014-162874 A | 9/2014 |
| JP | 2017-14478 A | 1/2017 |
| JP | 2017-160417 A | 9/2017 |

*Primary Examiner* — William J Klimowicz
(74) *Attorney, Agent, or Firm* — Hauptman Ham, LLP

(57) ABSTRACT

Provided is a PSA sheet that achieves both bonding reliability at a high temperature and reduction of outgassing. The PSA sheet provided by this invention comprises a substrate layer and a PSA layer provided to one face of the substrate layer. The PSA sheet exhibits a 180° peel strength of 1 N/20 mm or greater to stainless steel at 60° C. It has an amount of thermally released gas of 10 μg/cm² or less, determined at 130° C. for 30 minutes by GC-MS.

20 Claims, 3 Drawing Sheets

(56) References Cited

U.S. PATENT DOCUMENTS

| | | | |
|---|---|---|---|
| 2011/0151220 A1* | 6/2011 | Shirai | C09J 7/50 428/215 |
| 2014/0240869 A1 | 8/2014 | Furuta et al. | |
| 2016/0376473 A1 | 12/2016 | Furuta et al. | |
| 2017/0253773 A1 | 9/2017 | Furuta et al. | |
| 2017/0283661 A1* | 10/2017 | Yonezaki | C08F 220/18 |

\* cited by examiner

[Fig. 1]
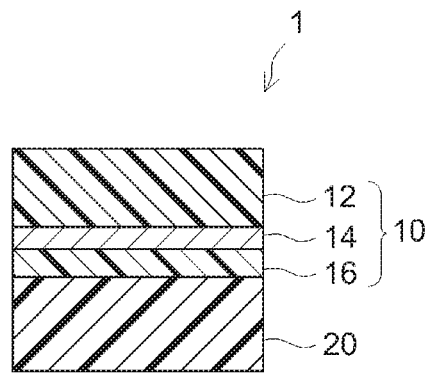
[Fig. 2]
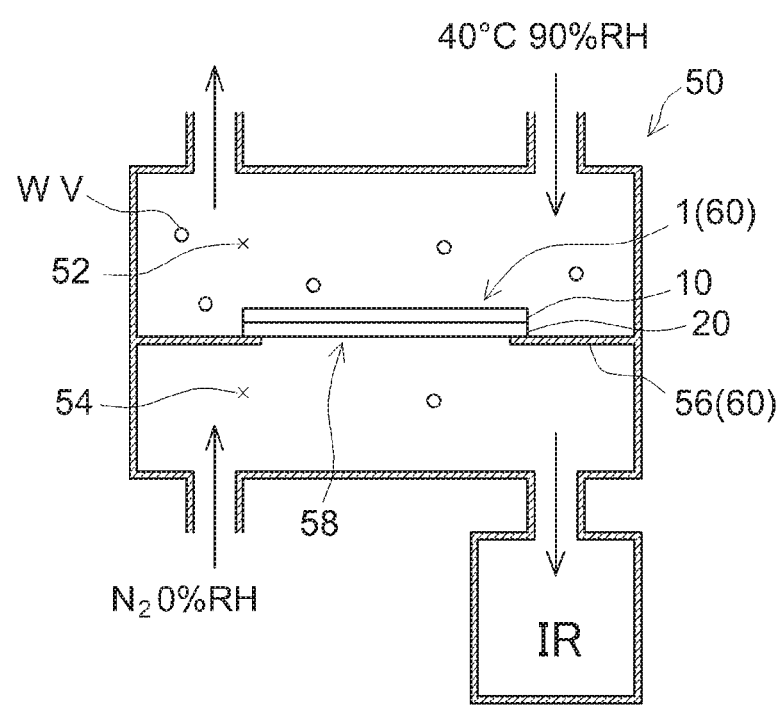

[Fig. 3]
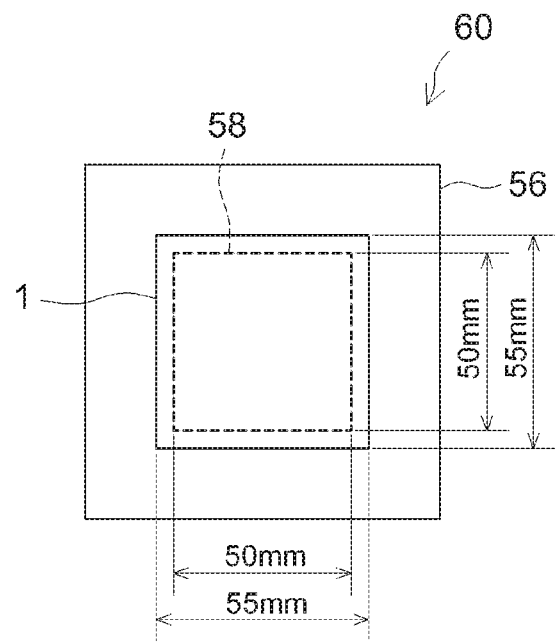
[Fig. 4]
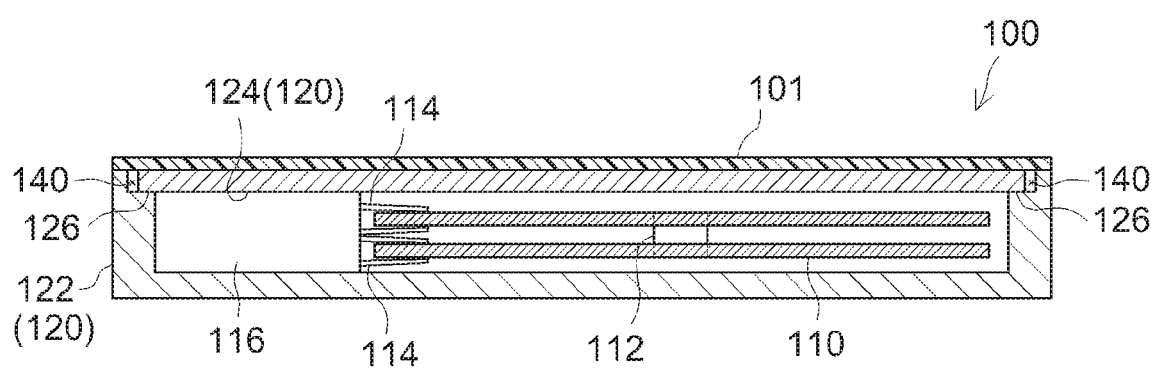

[Fig. 5]
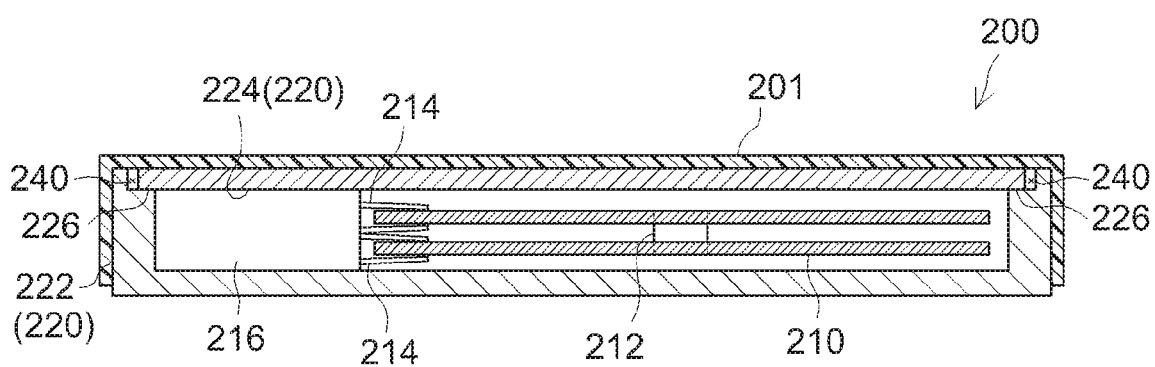

PRESSURE-SENSITIVE ADHESIVE SHEET AND MAGNETIC DISC DEVICE

CROSS-REFERENCE

The present invention claims priority to Japanese Patent Application No. 2017-253955 filed on Dec. 28, 2017 and Japanese Patent Application No. 2018-093149 filed on May 14, 2018; and the entire contents thereof are incorporated herein by reference.

BACKGROUND OF THE INVENTION

1. Field of the Invention

The present invention is related to a pressure-sensitive adhesive sheet and a magnetic disc device comprising the pressure-sensitive adhesive sheet.

2. Description of the Related Art

In general, pressure-sensitive adhesive (PSA) exists as a soft solid (a viscoelastic material) in a room temperature range and has a property to adhere easily to an adherend with some pressure applied. For such a property, PSA is widely used in a form of, for instance, an on-substrate PSA sheet having a PSA layer on a support substrate, for purposes such as bonding, fastening, protection and sealing in various applications including electronic devices. For instance, technical literatures related to PSA sheets that air-tightly seal internal spaces of magnetic disc devices include Japanese Patent Application Publication Nos. 2014-162874, 2017-014478 and 2017-160417. In this application, because the allowable maximum temperature is limited, PSA that does not require heat for press-bonding is preferably used as the bonding means.

SUMMARY OF THE INVENTION

For instance, the conventional PSA sheets all comprise non-breathable substrates and are used in magnetic disc devices such as hard disc drives (HDD), in embodiments to seal their internal spaces where magnetic discs (typically HD) are contained. In particular, a void space that can be present between a cover member and a housing base member in which the magnetic disc is placed can be covered and sealed with a PSA sheet so as to obtain air-tightness for the internal space of the device. Such air-tight properties may be essential and particularly important in a type of device whose internal space is filled with a low-density gas such as helium in order to reduce the influence of air flow generated by the spinning disc. In an embodiment using the PSA sheet, the sealing structure can be made thinner than in a conventional magnetic disc device for which air-tightness has been assured with a gasket; and therefore, this embodiment is advantageous in increasing the density and capacity of a magnetic disc device. This embodiment does not require use of a liquid gasket. Thus, it can mitigate outgassing (gas emission) problems due to gasket.

Naturally, with respect to a PSA sheet used as a sealing material, it is also necessary to reduce the amount of outgassing of this type (the amount of volatile gas released from the material). For instance, in an application to seal the internal space of a magnetic disc device such as HDD as described earlier, a volatile gas such as siloxane can damage the device; and therefore, in a PSA sheet used for this purpose, it is necessary to limit the amount of released gas within an allowable range. In the field of magnetic disc devices, it is desirable that the air-tight properties by means of a sealing material include moisture resistance. In particular, in this field, studies are underway on magnetic disc devices using HAMR (heat-assisted magnetic recording) for further increases in capacity. In short, HAMR is a technology that uses a laser beam to increase their surface recording densities. In this technology, the presence of internal moisture attenuates the laser beam and badly impacts on the recording life (the number of times that it can be overwritten). Thus, it is desirable to exclude moisture as much as possible. From the standpoint of such moisture resistance, it is advantageous to use a non-polar, highly-hydrophobic rubber-based PSA.

PSA can be exposed to various temperature changes depending on applications. For instance, the inside of an electronic device such as the magnetic disc device can reach a temperature as high as about 40° C. to 60° C. when in operation. Thus, PSA used in such applications is required to maintain at least a certain level of adhesive properties (adhesive strength, holding power, etc.) even when exposed to such temperatures (i.e. bonding reliability at a high temperature or high-temperature bonding reliability). In this temperature range, PSA using a styrene-based block copolymer can maintain its pseudo-crosslinking state to some degree; and therefore, it is superior in reliability of bonding properties to non-crosslinked rubber and the like. However, with the block copolymer, residual monomers such as styrene tend to volatilize and dissipate even after the PSA is formed. It is meaningful if reduction of outgassing can be combined with high-temperature bonding reliability comparable to that of PSA containing a styrene-based block copolymer.

The present invention has been made in view of these circumstances with an objective to provide a PSA sheet that brings about high-temperature bonding reliability and reduction of outgassing. Another objective of this invention is to provide a magnetic disc device using the PSA sheet.

[Solution to Problem]

The present description provides a PSA sheet comprising a substrate layer and a PSA layer provided to one face of the substrate layer. The PSA sheet exhibits a 180° peel strength of 1 N/20 mm or greater to stainless steel at 60° C. It has an amount of thermally released gas of 10 μg/cm² or less when determined at 130° C. for 30 minutes by gas chromatography/mass spectrometry (GC-MS). According to this embodiment, highly reliable bonding can be obtained at a high temperature because the to-SUS(60° C.) adhesive strength is at least 1 N/20 mm. In addition, because the amount of thermally released gas is 10 μg/cm² or less, the amount of outgassing is limited. In other words, according to the PSA sheet in this embodiment, high-temperature bonding reliability can be combined with reduction of outgassing.

In a preferable embodiment of the PSA sheet disclosed herein, the 180° peel strength to stainless steel at 60° C. is 2 N/20 mm or greater. The PSA sheet satisfying this property can provide greater high-temperature bonding reliability.

In a preferable embodiment of the PSA sheet disclosed herein, the PSA layer comprises a styrene-based block copolymer. The use of the styrene-based block copolymer can preferably bring about a PSA that provides highly reliable bonding at a high temperature. The styrene-based block copolymer is more preferably at least one species selected from the group consisting of styrene-isoprene block copolymers, styrene-butadiene block copolymers and their hydrogenation products.

In a preferable embodiment of the PSA sheet disclosed herein, the PSA layer has a thickness of 20 µm or less. According to the art disclosed herein, the amount of outgassing can be reduced by limiting the PSA layer's thickness and high-temperature bonding reliability can be obtained as well.

In a preferable embodiment of the PSA sheet disclosed herein, the substrate layer comprises a moisture-impermeable layer that has a moisture permeability (a water vapor transmission rate in the thickness direction) lower than $5 \times 10^{-1}$ g/m$^2 \cdot$24 h when determined at 40° C. at 90% RH based on the MOCON method (JIS K7129:2008). This can prevent moisture permeation in the PSA sheet's thickness direction.

In a preferable embodiment, the PSA sheet disclosed herein shows a displacement less than 2 mm in a shear holding power test carried out with a 1 kg load at 60° C. for one hour. The PSA sheet satisfying this property shows good holding power even when used at a relatively high temperature and provides greater high-temperature bonding reliability (reliable bonding at a high temperature).

In a preferable embodiment, the PSA sheet disclosed herein has a moisture permeability in the in-plane direction of bonding area of PSA sheet (i.e. a through-bonding-plane moisture permeability) lower than 90 µg/cm$^2 \cdot$24 h when determined at a permeation distance of 2.5 mm based on the MOCON method. The PSA sheet satisfying this property provides excellent moisture resistance and thus can be preferably used in an application where the presence of moisture and volatile gases are not desired. For instance, when the PSA sheet disclosed herein is used as a sealing material for a magnetic disc device, it has bonding reliability in a high temperature range which can be reached when the magnetic disc device is in operation and it also limits internal contamination by outgassing (siloxane, etc.) while greatly limiting changes in internal humidity (typically increases in humidity) which may affect the normal and highly precise operation of the device.

The PSA sheet disclosed herein can combine high-temperature bonding reliability and reduction of outgassing; and therefore, it is preferably used as a sealing material for various electronic devices whose insides can be exposed to high temperatures from about 40° C. to 60° C. and for which gas contamination is desirably limited. For instance, it is preferably used to seal the internal space of a magnetic disc device for which gas contamination needs to be limited. The art disclosed herein provides an electronic device (e.g. a magnetic disc device) comprising a PSA sheet disclosed herein. The PSA sheet may serve to seal the internal space of the magnetic disc device. In the magnetic disc device in such an embodiment, the PSA sheet is relatively thin, yet provides air-tight properties; and therefore, as compared to a conventional gasket-type product, the capacity can be further increased with a lower amount of released gas.

BRIEF DESCRIPTION OF THE DRAWINGS

FIG. 1 shows a cross-sectional diagram schematically illustrating an example of constitution of the PSA sheet.

FIG. 2 shows a schematic diagram illustrating the method for determining the moisture permeability.

FIG. 3 shows an enlarged top view of a sample used in determining the moisture permeability.

FIG. 4 shows a cross-sectional diagram schematically illustrating the magnetic disc device according to an embodiment.

FIG. 5 shows a cross-sectional diagram schematically illustrating the magnetic disc device according to another embodiment.

DETAILED DESCRIPTION OF THE INVENTION

Preferable embodiments of the present invention are described below. Matters necessary to practice this invention other than those specifically referred to in this description can be understood by a person skilled in the art based on the disclosure about implementing the invention in this description and common technical knowledge at the time the application was filed. The present invention can be practiced based on the contents disclosed in this description and common technical knowledge in the subject field. In the drawings referenced below, a common reference numeral may be assigned to members or sites producing the same effects, and redundant descriptions are sometimes omitted or simplified. The embodiments described in the drawings are schematized for clear illustration of the present invention, and do not necessarily represent the accurate size or reduction scale of an actual product of the PSA sheet or magnetic disc device of this invention or of the moisture permeability tester.

As used herein, the term "PSA" refers to, as described earlier, a material that exists as a soft solid (a viscoelastic material) in a room temperature range and has a property to adhere easily to an adherend with some pressure applied. As defined in "Adhesion: Fundamental and Practice" by C. A. Dahlquist (McLaren & Sons (1966), P. 143), in general, PSA referred to herein can be a material that has a property satisfying complex tensile modulus $E^*(1 \text{ Hz}) < 10^7$ dyne/cm$^2$ (typically, a material that exhibits the described characteristics at 25° C.).

The concept of PSA sheet herein may encompass so-called PSA tape, PSA labels, PSA film, etc. The PSA sheet disclosed herein can be in a roll or in a flat sheet. Alternatively, the PSA sheet may be processed into various shapes.

<Constitution of PSA Sheet>

The PSA sheet disclosed herein can be, for instance, an adhesively single-faced PSA sheet having a cross-sectional structure as shown in FIG. 1. A PSA sheet 1 comprises a substrate layer 10 and a PSA layer 20 supported on a first face of substrate layer 10. In particular, substrate layer 10 is a layered body (laminate film) in which a first resin layer 12, an inorganic layer 14 and a second resin layer 16 are layered in this order; and it is a moisture-impermeable layer that is impermeable to moisture in the thickness direction. The first resin layer 12 placed on the first face side of inorganic layer 14 forms an outer surface of PSA sheet 1 while the second resin layer 16 is placed on the second face side of inorganic layer 14, that is, the PSA layer 20 side. From the standpoint of the moisture resistance, PSA layer 20 is formed continuously over the entire first face of substrate layer 10 at least in the area that bonds to an adherend. PSA sheet 1 prior to use (before applied to the adherend) may be protected with a release liner (not shown in the drawing) having a release face at least on the PSA layer 20 side surface.

<Properties of PSA Sheet>

The PSA sheet disclosed herein is characterized by having a 180° peel strength to stainless steel at 60° C. (to-SUS(60° C.) adhesive strength) of 1 N/20 mm or greater when determined based on JIS Z 0237:2009. Having such a to-SUS(60° C.) adhesive strength, the PSA sheet can well maintain the bonding with adherend even in a temperature range above room temperature and thus provides great high-temperature bonding reliability. This leads to good sealing properties obtained even in a high temperature range. The to-SUS(60° C.) adhesive strength is preferably about 1.5 N/20 mm or greater, more preferably about 2 N/20 mm or greater, yet more preferably about 2.5 N/20 mm or greater, or particularly preferably about 3 N/20 mm or greater. The maximum to-SUS(60° C.) adhesive strength is not particularly limited. From the standpoint of preventing left-over adhesive residue, it is suitably about 20 N/20 mm or less; it can be, for instance, about 15 N/20 mm or less, about 10 N/20 mm or less, or even about 5 N/20 mm or less.

The to-SUS(60° C.) adhesive strength of a PSA sheet is determined by the following method: A PSA sheet subject to measurement is cut to a 20 mm wide, 100 mm long size to prepare a test piece. In an environment at 23° C. and 50% RH, the adhesive face of the test piece is press-bonded to a stainless steel plate (SUS304BA plate) to obtain a measurement sample. The press-bonding is carried out by rolling a 2 kg roller back and forth once. The measurement sample is left standing in an environment at 60° C. for 30 minutes. Subsequently, using a tensile tester, based on JIS Z 0237:2009, the peel strength (N/20 mm) is determined at a tensile speed of 300 mm/min at a peel angle of 180°. As the tensile tester, Precision Universal Tensile Tester Autograph AG-IS 50N available from Shimadzu Corporation or a comparable product can be used. The same measurement method is employed in the working examples described later.

The PSA sheet disclosed herein preferably has a 180° peel strength to stainless steel (to-SUS(rt) adhesive strength) of 1 N/20 mm or greater when determined based on JIS Z 0237:2009. Having such an adhesive strength, the PSA sheet can bond well to an adherend to provide good sealing. The to-SUS(rt) adhesive strength is more preferably 2 N/20 mm or greater, yet more preferably 4 N/20 mm or greater, or particularly preferably 6 N/20 mm or greater (e.g. 7 N/20 mm or greater). The maximum to-SUS(rt) adhesive strength is not particularly limited. From the standpoint of preventing left-over adhesive residue, it is suitably about 20 N/20 mm or less (e.g. about 15 N/20 mm or less).

The adhesive strength of a PSA sheet is determined by the following method: A PSA sheet subject to measurement is cut to a 20 mm wide, 100 mm long size to prepare a test piece. In an environment at 23° C. and 50% RH, the adhesive face of the test piece is press-bonded to a stainless steel plate (SUS304BA plate) to obtain a measurement sample. The press-bonding is carried out by rolling a 2 kg roller back and forth once. The measurement sample is left standing in an environment at 23° C. and 50% RH for 30 minutes. Subsequently, using a tensile tester, based on JIS Z 0237:2009, the peel strength (N/20 mm) is determined at a tensile speed of 300 mm/min at a peel angle of 180°. As the tensile tester, Precision Universal Tensile Tester Autograph AG-IS 50N available from Shimadzu Corporation or a comparable product can be used. The same measurement method is employed in the working examples described later.

The PSA sheet disclosed herein is characterized by having an amount of thermally released gas of 10 μg/cm$^2$ or less (in particular, 0 to 10 μg/cm$^2$) when determined at 130° C. for 30 minutes by GC-MS. The PSA sheet with such highly-limited thermal gas release can be preferably used in an application (typically a magnetic disc device) for which the presence of volatile gas is undesirable. When the PSA sheet satisfying this property is used as a sealing material for a magnetic disc device, it can highly inhibit internal contamination with siloxane and other gas that affect the device. The amount of thermally released gas is preferably about 7 μg/cm$^2$ or less, or more preferably about 5 μg/cm$^2$ or less; it can be, for instance, about 3 μg/cm$^2$ or less, or even about 1 μg/cm$^2$ or less.

The amount of thermally released gas is determined based on the dynamic headspace method. In particular, a PSA sheet subject to measurement is cut out to a 7 cm$^2$ size to obtain a measurement sample. The measurement sample is sealed in a 50 mL vial and heated at 130° C. for 30 minutes, using a headspace autosampler. As the headspace autosampler, a commercial product can be used without particular limitations. For instance, product name EQ-12031HSA available from JEOL Ltd., or a comparable product can be used. The total amount of gas released from the measurement sample is determined by gas chromatography/mass spectrometry (GC-MS). A commercial GC-MS can be used. The amount of thermally released gas is the amount of gas released per unit surface area of PSA sheet (in μg/cm$^2$). The same measurement method is employed in the working examples described later.

The PSA sheet disclosed herein preferably has a through-bonding-plane moisture permeability lower than 90 μg/cm$^2$·24 h when determined at a permeation distance of 2.5 mm based on the MOCON method (equal-pressure method). This limits the moisture permeation in the in-plane direction of the bonding area (in the direction perpendicular to the thickness direction of the PSA sheet) and excellent moisture resistance can be preferably obtained. The through-bonding-plane moisture permeability is preferably less than 50 μg/cm$^2$; it can be, for instance, less than 30 μg/cm$^2$.

In particular, the through-bonding-plane moisture permeability is determined by the method described below.

(1) A metal plate having a 50 mm square opening at the center is obtained. FIG. 2 outlines a moisture permeability tester 50 used for determining the moisture permeability. In FIG. 2, reference number 56 shows the metal plate and reference number 58 shows the opening made in metal plate 56. FIG. 3 shows a top view of metal plate 56 having opening 58.

(2) The PSA sheet subject to measurement is cut to a 55 mm square and applied to cover the opening in the metal plate to prepare a measurement sample. The PSA sheet is applied to the metal plate over a bonded width of 2.5 mm at each side of the opening. The PSA sheet is applied by rolling a 2 kg roller back and forth once. The bonded width of the PSA sheet at each side of the opening is the width of the band of bonding area between the PSA sheet and the metal plate, indicating the permeation distance (mm) in the in-plane direction of bonding area of the PSA sheet. The circumference of the opening in the metal plate is referred to as the bonded length (mm). The bonded length (mm) is the total length of the band of bonding area exposed to water vapor. In particular, the measurement sample has a structure shown by reference number 60, formed of metal plate 56 and PSA sheet 1 applied to metal plate 56.

(3) Based on Method B of JIS K 7129:2008, the measurement sample is placed between a dry chamber and a wet chamber in the moisture permeability tester. In particular, as shown in FIG. 2, a measurement sample 60 is positioned between a dry chamber 54 and a wet chamber 52. In FIG. 2, WV represents water vapor.

(4) Based on the MOCON method (equal-pressure method), conditioning is carried out for 3 hours. Subsequently, as shown in FIG. 2, at 40° C. and 90% RH, the amount (μg) of moisture that has permeated in the in-plane direction of bonding area of PSA sheet per one hour is determined.

(5) To obtain the through-bonding-plane moisture permeability (μg/cm²·24 h), the amount of permeated moisture per 24 hours converted from the measurement value and the PSA layer's surface area (permeation distance× bonded length) are substituted into the equation:

Moisture permeability (μg/cm²·24 h)=amount of permeated moisture (μg)/(permeation distance (cm)×bonded length (cm)×24 h)

As used herein, the "through-bonding-plane moisture permeability (μg/cm²·24 h) determined at a permeation distance of 2.5 mm based on the MOCON method (equal-pressure method)" can be a value obtained by a measurement of 24 hours, but it is not limited to this; as described above, it can be a 24-hour value converted from a measurement taken for a certain time period (e.g. one hour). The measurement time can be longer than one hour (preferably about 6 hours; the same applies to the working examples described later) and the value per 24 hours converted from this measurement value can be used as well.

The kind of metal plate is not particularly limited. For instance, an aluminum plate can be used. The size of the metal plate is not particularly limited, either. In accordance with the tester size, etc., for instance, a 100 mm square plate can be used. It is suitable to use a metal plate having a smooth surface, for instance, one having a mean arithmetic roughness Ra of about 3 μm or less. As the tester, product name PERMATRAN-3/34G available from MOCON, Inc. or a comparable product can be used. In a tester of this type, $N_2$ gas at 90% RH can be supplied to the wet chamber and $N_2$ gas at 0% RH can be supplied to the dry chamber. This maintains the two chambers divided by the measurement sample at an equal pressure. In the tester, the water vapor concentration is measured by an infrared sensor (indicated as "IR" in FIG. 2), but the means of detection is not limited to this. The position of the measurement sample in the tester is not particularly limited. The adhesive face of the PSA sheet can be placed either on the wet chamber side or on the dry chamber side. The same measurement method is employed in the working examples described later.

This measurement method has been created by the present inventors. This method can accurately measure the amount of moisture that permeates in the in-plane direction, which has been heretofore impossible. More specifically, between different samples showing similar values in the moisture permeability test by the conventional cup method, a significant difference in through-bonding-plane moisture permeability can be detected. The use of this method allows for a higher-level evaluation of moisture resistance. For instance, it can quantify a minute water vapor transmission which may affect HAMR.

The PSA sheet disclosed herein preferably shows a displacement less than 2 mm in a shear holding power test carried out with a 1 kg load at 60° C. for one hour. The PSA sheet satisfying this property shows good holding power even when used at a relatively high temperature. The displacement in the shear holding power test is more preferably less than 1 mm, or yet more preferably less than 0.7 mm (e.g. less than 0.5 mm, or even less than 0.1 mm) The PSA sheet according to a particularly preferable embodiment shows no displacement (i.e. a displacement of about 0 mm) in the shear holding power test.

The shear holding power of a PSA sheet is determined by the following method: In particular, the PSA sheet subject to measurement is cut 10 mm wide, 20 mm long to prepare a test piece. In an environment at 23° C. and 50% RH, the adhesive face of the test piece is press-bonded to a stainless steel plate to obtain a measurement sample. The press-bonding is carried out by rolling a 2 kg roller back and forth once. The measurement sample is vertically suspended and left in an environment at 60° C. and 50% RH for 30 minutes. Subsequently, a 1 kg weight is attached to the free lower end of the test piece to start the test. The test is carried out for one hour and the distance that the test piece displaced (the displacement) is measured at one hour. The same measurement method is employed in the working examples described later.

The PSA sheet disclosed herein preferably has a tensile modulus per unit width in a prescribed range. In particular, the tensile modulus is preferably greater than 1000 N/cm, more preferably greater than 1400 N/cm, yet more preferably greater than 1800 N/cm, or particularly preferably greater than 2200 N/cm. The PSA sheet having such a tensile modulus has suitable rigidity and is less susceptible to creasing. It tends to provide excellent handling properties as well. The tensile modulus is preferably less than 3500 N/cm, more preferably less than 3000 N/cm, or yet more preferably less than 2800 N/cm (e.g. less than 2600 N/cm). The PSA sheet having such a tensile modulus has good adherend conformability and can well conform in a bent state to an area of the adherend including a corner.

The tensile modulus per unit width of PSA sheet is determined as follows: In particular, the PSA sheet is cut to a 10 mm wide, 50 mm long strip to prepare a test piece. The two ends of the length of the test piece are clamped with chucks in a tensile tester. In an atmosphere at 23° C., at an inter-chuck distance of 20 mm, at a speed of 50 mm/min, a tensile test is conducted using the tensile tester to obtain a stress-strain curve. Based on the initial slope of the resulting stress-strain curve, the Youngs modulus (N/mm²=MPa) is determined by linear regression of the curve between two specified strain points ε1 and ε2. From the product of the resulting value and the thickness of the PSA sheet, the tensile modulus per unit width (N/cm) can be determined. As the tensile tester, a commonly known or conventionally used product can be used. For instance, AUTOGRAPH AG-IS available from Shimadzu Corporation or a comparable product can be used.

<Total Thickness of PSA Sheet>

The total thickness of the PSA sheet disclosed herein is not particularly limited. It is suitably about 6 μm or greater. From the standpoint of the moisture resistance and crease resistance, etc., it is preferably 25 μm or greater, more preferably 40 μm or greater, or yet more preferably 60 μm or greater. The total thickness is suitably about 12 mm or less. From the standpoint of the adherend conformability and of reducing the thickness and weight, it is preferably 200 μm or less, more preferably 150 μm or less, or yet more preferably 120 μm or less (e.g. less than 100 μm). The total thickness of a PSA sheet here refers to the combined thickness of the substrate layer and the PSA layer, not including the thickness of the release liner described later.

<PSA Layer>

In the art disclosed herein, the type of PSA forming the PSA layer is not particularly limited. The PSA may comprise, as its base polymer, one, two or more species of various rubber-like polymers such as rubber-based polymers, acrylic polymers, polyester-based polymers, urethane-based polymers, polyether-based polymers, silicone-based polymers, polyamide-based polymer and fluorine-based polymers that are known in the PSA field. From the standpoint of the moisture resistance and reduction of outgassing, it is preferable to use a rubber-based PSA comprising a rubber-based polymer as the base polymer or a PSA comprising an acrylic polymer as the base polymer. Other examples include a PSA comprising a rubber-based polymer and an acrylic polymer as the base polymer. In particular, a highly moisture-resistant rubber-based PSA layer is more preferable. When the PSA sheet disclosed herein is used in a magnetic disc device, it is desirable that the PSA is essentially free of a silicone-based polymer which may form siloxane gas.

The PSA sheet having a rubber-based PSA layer is primarily discussed below; however, the PSA layer of the PSA sheet disclosed herein is not limited to a layer formed of a rubber-based PSA.

The "base polymer" of PSA refers to the primary component among rubber-like polymers (polymers that exhibit rubber elasticity in a near-room temperature range) (i.e. a component accounting for more than 50% by weight of the rubber-like polymers) in the PSA The PSA layer disclosed herein is preferably a rubber based PSA layer formed from a PSA composition whose base polymer is a rubber-based polymer. Examples of the base polymer include various rubber-based polymers such as natural rubber; styrene-butadiene rubber (SBR); polyisoprene; a butene-based polymer comprising butene (referring to 1-butene as well as cis- or trans-2-butene) and/or 2-methylpropane (isobutylene) as the primary monomer(s); A-B-A block copolymer rubber and a hydrogenation product thereof, for instance, styrene-butadiene-styrene block copolymer rubber (SBS), styrene-isoprene-styrene block copolymer rubber (SIS), styrene-isobutylene-styrene block copolymer rubber (SIBS), styrene-vinyl isoprene-styrene block copolymer rubber (SVIS), styrene-ethylene-butylene-styrene block copolymer rubber (SEBS) which is a hydrogenation product of SBS, styrene-ethylene-propylene-styrene block copolymer rubber (SEPS) which is a hydrogenation product of SIS, and styrene-isoprene-propylene-styrene block copolymer (SIPS). Among these rubber-based polymers, solely one species or a combination of two or more species can be used.
(Block Copolymer)

The PSA layer according to a preferable embodiment comprises a block copolymer of a monovinyl-substituted aromatic compound and a conjugated diene compound. As used herein, the "block copolymer of a vinyl-substituted aromatic compound and a conjugated diene compound" refers to a polymer comprising at least one each of a segment (segment A) that comprises a monovinyl-substituted aromatic compound as the primary monomer (which refers to a copolymer component accounting for more than 50% by weight; the same applies hereinafter) and a segment (segment B) that comprises a conjugated diene compound as the primary monomer. In general, the glass transition temperature of segment A is higher than that of segment B. Typical structures of such a polymer include an ABA triblock copolymer having a triblock structure where segment A (hard segment) is coupled to each terminus of segment B (soft segment), and an AB diblock copolymer having a diblock structure formed of one segment A and one segment B.

The monovinyl-substituted aromatic compound refers to a compound in which a functional group having a vinyl group is bonded to an aromatic ring. Typical examples of the aromatic ring include a benzene ring (which can be a benzene ring substituted with a functional group (e.g., an alkyl group) containing no vinyl groups). Examples of the monovinyl-substituted aromatic compound include styrene, α-methyl styrene, vinyl toluene, and vinyl xylene. Examples of the conjugated diene compound include 1,3-butadiene, and isoprene. Among such block copolymers, one species can be used solely, or two or more species can be used together as the base polymer.

The block copolymer of a monovinyl-substituted aromatic compound and a conjugated diene compound can be a hydrogenation product in which it has be at least partially hydrogenated (having added hydrogen atoms). In the hydrogenated block copolymer, at least some of the carbon-carbon double bonds of repeat units derived from the conjugated diene compound are reduced to single bonds. At least part of segment B (soft segment) of such a block copolymer may be formed of a polyolefin such as polyethylene, polypropylene, polybutylene, polyisobutylene, poly(ethylene-propylene), and poly(ethylene-butylene). The hydrogenated block copolymer has excellent thermal stability and weatherability. The block copolymer can be hydrogenated using a hydrogenation catalyst (e.g. Ni, Co Ziegler catalyst, metallocene catalyst, a rare metal catalyst carrying Pt, etc.) known in the synthetic rubber field, employing commonly known or conventionally used method and conditions.

In segment A (hard segment) in the block copolymer, the monovinyl-substituted aromatic compound (two or more species can be used) preferably has a copolymerization ratio of about 70% by weight or higher (more preferably about 90% by weight or higher, or possibly essentially 100% by weight). In segment B (soft segment) in the block copolymer, the conjugated diene compound (including a hydrogenation product thereof, two or more species can be used) preferably has a copolymerization ratio of about 70% by weight or higher (more preferably about 90% by weight or higher, or possibly essentially 100% by weight). Such a block copolymer can bring about a higher-performance PSA sheet.

The block copolymer may be a diblock copolymer, a triblock copolymer, a radial copolymer, a mixture of these, or the like. In a triblock copolymer or a radial copolymer, it is preferable that segment A (e.g., a styrene block) is placed at a terminal of the polymer chain. Segment A placed terminally on the polymer chain is likely to aggregate to form a domain, whereby a pseudo-crosslinking structure is formed, resulting in increased cohesive strength of the PSA.
(Styrene-Based Block Copolymer)

In a preferable embodiment of the art disclosed herein, the PSA layer comprises a styrene-based block copolymer. As used herein, the "styrene-based block copolymer" refers to a polymer comprising at least one styrene block. The "styrene block" refers to a segment comprising styrene as the primary monomer. A typical example of a styrene block referred to herein is a segment essentially formed of styrene.

The PSA layer according to a preferable embodiment comprises, as the styrene-based block copolymer, at least one species selected among, for instance, styrene-isoprene block copolymers, styrene-butadiene block copolymers and their hydrogenation products. As used herein the "styrene-isoprene block copolymer" refers to a polymer comprising at least one styrene block and at least one isoprene block (a segment comprising isoprene as the primary monomer). Typical examples of the styrene-isoprene block copolymer include a triblock copolymer having a triblock structure where a styrene block (hard segment) is coupled to each terminus of an isoprene block (soft segment), and a cliblock copolymer having a cliblock structure formed of one isoprene block and one styrene block. The "styrene-butadiene block copolymer" refers to a polymer comprising at least one styrene block and at least one butadiene block (a segment comprising butadiene as the primary monomer). The hydrogenation product of styrene-isoprene block copolymer refers to a copolymer whose isoprene block is at least partially hydrogenated. Similarly, the hydrogenation product of styrene-butadiene block copolymer refers to a copolymer whose butadiene block is at least partially hydrogenated.

The art disclosed herein can be preferably implemented in an embodiment where, of the styrene-based block copolymer in the PSA, the ratio of styrene-isoprene block copolymer is about 50% by weight or higher (e.g. 70% by weight or higher), the ratio of styrene-butadiene block copolymer is 50% by weight or higher (e.g. 70% by weight or higher), or the combined ratio of styrene-isoprene block copolymer and styrene-butadiene block copolymer is about 50% by weight or higher (e.g. 70% by weight or higher).

In another preferable embodiment, of the styrene-based block copolymer in the PSA, the ratio of hydrogenated styrene-based block copolymer is about 50% by weight or higher, more preferably about 75% by weight or higher, or yet more preferably 90% by weight or higher. In a more preferable embodiment, essentially all (e.g. about 95% to 100% by weight) of the styrene-based block copolymer is hydrogenated. Favorable examples of the styrene-based block copolymer include hydrogenated styrene-isoprene block copolymers and hydrogenated styrene-butadiene block copolymers. Among them, hydrogenated styrene-isoprene block copolymers are more preferable.

The styrene content of the styrene-based block copolymer can be, for instance, about 5% to 40% by weight. From the standpoint of enhancing the cohesion to obtain high-temperature bonding reliability, a styrene-based block copolymer having about an 8% by weight or higher (more preferably 10% by weight or higher) styrene content is preferable. From the standpoint of the peel strength at room temperature and reduction of outgassing, the styrene content is preferably about 30% by weight or less (typically about 20% by weight or less, more preferably about 15% by weight or less). The "styrene content" of a styrene-based block copolymer refers to the weight fraction of styrene residue in the total weight of the block copolymer. The styrene content can be determined by NMR (nuclear magnetic resonance spectroscopy).

In the art disclosed herein, when a block copolymer of a monovinyl-substituted aromatic compound and a conjugated diene compound (e.g. a styrene-based block copolymer) is used as the base polymer, it may comprise one, two or more species of rubber-like polymer besides the block copolymer. The rubber-like polymer can be various polymers such as acrylic, polyester-based, urethane-based, polyether-based, olefinic, rubber-based, silicone-based, polyamide-based, fluorine-based, vinyl acetate-based, vinyl chloride-based, vinyl alcohol-based, vinyl acetal-based, and vinyl butyral-based polymers. Examples of the rubber-based rubber-like polymer include natural rubber, acrylonitrile-butadiene rubber, isoprene rubber, chloroprene rubber, polyisobutylene, butyl rubber, and reclaimed rubber.

In a preferable embodiment of the PSA sheet disclosed herein, the block copolymer accounts for more than 50% by weight (e.g. 70% by weight or more, or even 85% by weight or more) of polymers in the PSA. The art disclosed herein can be preferably implemented in an embodiment where the PSA layer is essentially free of other rubber-like polymers besides the block copolymer (e.g. in an embodiment where their content is 0 to 1 part by weight per 100 parts by weight of the block copolymer).

In another preferable embodiment, the PSA layer may have a composition that comprises other rubber-like polymer(s) besides the block copolymer. In this case, the amount of other rubber-like polymer(s) used besides the block copolymer is usually suitably about 500 parts by weight or less to 100 parts by weight of the block copolymer. From the standpoint of preferably obtaining the effect of the block copolymer, it is preferably about 300 parts by weight or less, or more preferably about 100 parts by weight or less; for instance, it can be about 50 parts by weight or less, about 30 parts by weight or less, or even about 10 parts by weight or less. From the standpoint of reduction of outgassing, besides the block copolymer, other rubber-like polymers (favorably rubber-based polymer(s), e.g. polyisobutylene, butyl rubber, etc.) can be included at or above about 10 parts by weight (e.g. at or above about 50 parts by weight) to 100 parts by weight of the block copolymer.

The molecular weight of the base polymer (e.g. a styrene-based block copolymer) is not particularly limited. For instance, a species having a weight average molecular weight (Mw) of about $5 \times 10^4$ or higher (preferably about $15 \times 10^4$ or higher, e.g. about $20 \times 10^4$ or higher) can be suitably selected and used. The maximum Mw is not particularly limited and can be about $150 \times 10^4$ or lower (preferably about $100 \times 10^4$ or lower, e.g. about $50 \times 10^4$ or lower). Several polymer species varying in Mw can be combined and used as the base polymer. Having a Mw in these ranges, the PSA can be easily adjusted to have an elasticity in a preferable range and is likely to show good cohesive strength.

While no particular limitations are imposed, the base polymer (e.g. a styrene-based block copolymer) suitably has a dispersity (Mw/Mn) (which is indicated as a ratio of weight average molecular weight (Mw) to number average molecular weight (Mn)) below about 7, preferably below about 5, more preferably below about 3, or yet more preferably below about 2. The Mw/Mn value is theoretically 1 or greater and usually 1.1 or greater. The art disclosed herein can be implemented in an embodiment where the base polymer has a Mw/Mn value of about 1.3 or greater (e.g. about 1.5 or greater). Several polymer species varying in Mw/Mn can be combined and used as the base polymer.

The Mw and Mn values of an isobutylene-based polymer here refer to values based on polystyrene that are determined by gel permeation chromatography (GPC) analysis. As the GPC analyzer, for instance, model name HLC-8120 GPC available from Tosoh Corporation can be used.

In a preferable embodiment, the PSA layer may have a composition in which the total amount of the base polymer accounts for more than 50% by weight of the total weight of the PSA layer (i.e. the weight of the PSA layer formed of this particular PSA). For instance, the total amount of the base polymer is preferably about 75% by weight or more of the total weight of the PSA layer, more preferably about 85% by weight or more, or yet more preferably about 90% by weight or more (e.g. 95% by weight or more).

(Additives)

The PSA composition may comprise, as necessary, various additives generally used in the PSA field, such as tackifier (tackifier resin), leveling agent, crosslinking agent, crosslinking accelerator, plasticizer, fillers, colorants including pigments and dyes, softening agent, anti-static agent, anti-aging agent, UV-absorbing agent, antioxidant and photo-stabilizing agent. With respect to these various additives, heretofore known species can be used by typical methods. In the art disclosed herein, the amount of outgassing from the PSA sheet is limited to or below a prescribed value. Thus, it is desirable to avoid using a low-molecular-weight component which may be susceptible to outgassing. From such a standpoint, the other additive content (e.g. tackifier resin) in the PSA layer is preferably limited to or below about 10% by weight (e.g. to or below 5% by weight, typically to or below 3% by weight). The art disclosed herein can be preferably implemented in an embodiment where the PSA layer is essentially free of other additives (e.g. tackifier resin).

The PSA layer can be formed based on a method for forming a PSA layer in a known PSA sheet. For example, it is preferable to use a method (direct method) where a PSA composition having PSA-layer-forming materials dissolved or dispersed in a suitable solvent is directly provided (typically applied) to a substrate (e.g. a moisture-impermeable layer) and allowed to dry to form a PSA layer. In another method (transfer method) that can be employed, the PSA composition is provided to a highly-releasable surface (e.g. a surface of a release liner, a substrate's back face that has been treated with release agent, etc.) and allowed to dry to form a PSA layer on the surface, and the PSA layer is transferred to a support substrate (e.g. a moisture-impermeable layer). As the release face, a surface of a release liner, a substrate's back face that has been treated with release agent, and the like can be used. The PSA layer disclosed herein is typically formed in a continuous manner.

The form of the PSA composition is not particularly limited. For instance, it can be in various forms, such as a PSA composition (a solvent-based PSA composition) that comprises PSA-layer-forming materials as described above in an organic solvent, a PSA composition (water-dispersed PSA composition, typically an aqueous emulsion-based PSA composition) in which the PSA is dispersed in an aqueous solvent, a PSA composition that is curable by an active energy ray (e.g. UV ray), and a hot-melt PSA composition. From the standpoint of the ease of application and the adhesive properties, a solvent-based PSA composition can be preferably used. As the solvent, it is possible to use one species of solvent or a mixture of two or more species, selected among aromatic compounds (typically aromatic hydrocarbons) such as toluene and xylene; acetic acid esters such as ethyl acetate and butyl acetate; and aliphatic or alicyclic hydrocarbons such as hexane, cyclohexane, heptane and methyl cyclohexane. While no particular limitations are imposed, it is usually suitable to adjust the solvent-based PSA composition to include 5% to 30% non-volatiles (NV) by weight. Too low an NV tends to result in higher production costs while too high an NV may degrade the handling properties such as the ease of application.

The PSA composition can be applied, for instance, with a known or commonly used coater such as gravure roll coater, reverse roll coater, kiss roll coater, dip roll coater, bar coater, knife coater, and spray coater.

In the art disclosed herein, the thickness of the PSA layer forming the adhesive face is not particularly limited. The PSA layer has a thickness of suitably about 3 µm or greater, preferably about 5 µm or greater, more preferably about 8 µm or greater, or yet more preferably about 10 µm or greater, for instance, possibly about 15 µm or greater. With increasing thickness of the PSA layer, the adhesive strength to adherend tends to increase. Having at least a certain thickness, the PSA layer absorbs the adherend's surface roughness to form tight adhesion. When the PSA layer has a thickness of about 10 µm or greater, for instance, it can provide good, tight adhesion to an adherend having a surface whose arithmetic mean surface roughness Ra is about 1 µm to 5 µm (e.g. 3 µm). The thickness of the PSA layer forming the adhesive face can be, for instance, about 150 µm or less; it is suitably about 100 µm or less, or preferably about 50 µm or less. With decreasing thickness of the PSA layer, it tends to show a greater ability to inhibit water vapor from laterally permeating the PSA layer, leading to reduction of outgassing from the PSA layer. A smaller thickness of the PSA layer is also advantageous from the standpoint of reducing the thickness and weight of the PSA sheet. From the standpoint of reduction of outgassing, the thickness of the PSA layer can be less than 30 µm or it is suitably 25 µm or less (e.g. less than 20 µm).

(Properties of PSA Layer)

The storage modulus at 25° C., G'(25° C.), of the PSA layer disclosed herein is not particularly limited and it can be set in a suitable range according to required properties, etc. In a preferable embodiment, the G'(25° C.) is less than 0.5 MPa. In a room-temperature range, the PSA layer whose G'(25° C.) is at or below a prescribed value wets the adherend surface well to form tight adhesion. The G'(25° C.) is more preferably 0.4 MPa or less, yet more preferably 0.3 MPa or less, or particularly preferably 0.25 MPa or less. The G'(25° C.) is most preferably 0.2 MPa or less (e.g. 0.15 MPa or less). The G'(25° C.) value is not particularly limited and is suitably greater than about 0.01 MPa. From the standpoint of the adhesive properties at room temperature and of preventing leftover adhesive residue, etc., it is preferably 0.05 MPa or greater, or more preferably 0.07 MPa or greater (e.g. 0.1 MPa or greater).

The storage modulus at 60° C., G'(60° C.), of the PSA layer disclosed herein is not particularly limited and it can be set in a suitable range according to required properties, etc. In a preferable embodiment, the G'(60° C.) is less than 0.5 MPa. With the use of a PSA layer whose G'(60° C.) is at or below a prescribed value, good adhesion can be maintained even in a temperature range above room temperature. The G'(60° C.) is more preferably 0.3 MPa or less, yet more preferably 0.2 MPa or less, or particularly preferably 0.1 MPa or less. The G'(60° C.) is not particularly limited and is suitably greater than about 0.01 MPa. From the standpoint of the bonding reliability at a high temperature, it is preferably 0.03 MPa or greater, or more preferably 0.05 MPa or greater.

In the art disclosed herein, the storage moduli G'(25° C.) and G'(60° C.) of a PSA layer can be determined by dynamic elastic modulus measurement. In particular, several layers of the PSA subject to measurement are layered to fabricate an approximately 2 mm thick PSA layer. A specimen obtained by punching out a disc of 7.9 mm diameter from the PSA layer is fixed between parallel plates. With a rheometer (e.g. ARES available from TA Instruments or a comparable system), dynamic elastic modulus measurement is carried out to determine storage moduli G'(25° C.) and G'(60° C.). The PSA (layer) subject to measurement can be formed by applying a layer the corresponding PSA composition on a release face of a release liner or the like and allowing it to dry or cure. The thickness (coating thickness) of the PSA layer subjected to the measurement is not particularly limited as long as it is 2 mm or less. It can be, for instance, about 50 µm.

Measurement mode: shear mode
Temperature range: −50° C. to 150° C.
Heating rate: 5° C./min
Measurement frequency: 1 Hz The same measurement method is also used in the working examples described later.

<Substrate Layer>

The material forming the substrate layer in the art disclosed herein is not particularly limited. As the substrate layer, a suitable species can be selected and used according to the intended purpose of the PSA sheet among, for instance, plastic films such as polypropylene films, ethylene-propylene copolymer films, polyester films, and polyvinyl chloride films; foam sheets made of foam such as polyurethane foam, polyethylene foam, and polychloroprene foam; woven fabrics and nonwoven fabrics (meaning to include paper such as Washi and high-grade paper) of a single species or a blend, etc., of various species of fibrous substances (which can be natural fibers such as hemp and cotton; synthetic fibers such as polyester and vinylon; and semi-synthetic fibers such as acetate); and metal foil such as aluminum foil and copper foil.

The substrate layer according to a preferable embodiment is a moisture-impermeable layer. As used herein, the moisture-impermeable layer refers to a layer (film) having a moisture permeability (a water vapor transmission rate in the thickness direction) lower than $5 \times 10^1$ g/m$^2 \cdot$24 h when determined at 40° C. at 90% RH based on the MOCON method (JIS K7129:2008). The moisture-impermeable layer in the art disclosed herein is formed by suitably selecting materials and a way of layering so as to satisfy the moisture impermeability. With the use of the moisture-impermeable layer, it is possible to obtain a PSA sheet resistant to moisture in the thickness direction. The moisture permeability is preferably lower than $5 \times 10^{-2}$ g/m$^2 \cdot$24 h, or more preferably lower than $5 \times 10^{-3}$ g/m$^2 \cdot$24 h, for instance, lower than $5 \times 10^{-5}$ g/m$^2 \cdot$24 h. As the moisture permeability tester, PERMATRAN W3/33 available from MOCON, Inc. or a comparable product can be used.

In a preferable embodiment, the substrate layer disclosed herein includes an inorganic layer. The material or structure of the inorganic layer is not particularly limited and can be selected in accordance of the purpose and usage. From the standpoint of the moisture resistance and air-tight properties, it is advantageous that the inorganic layer is essentially non-porous. In typical, a preferable inorganic layer is essentially formed of an inorganic material. For instance, an inorganic layer formed of at least 95% (by weight) inorganic material is preferable (more preferably at least 98% by weight, or yet more preferably at least 99% by weight). The number of inorganic layers in the substrate layer is not particularly limited; it can be one, two or more (e.g. about two to five). From the standpoint of the ease of manufacturing and availability, the number of inorganic layers in the substrate is preferably about 1 to 3, or more preferably one or two. When the substrate layer includes several inorganic layers, the materials and structures (thicknesses, etc.) of these inorganic layers can be the same with or different from one another.

As the inorganic material forming the inorganic layer, it is possible to use, for instance, metal materials including elemental metals such as aluminum, copper, silver, iron, tin, nickel, cobalt, and chromium as well as alloys of these; and inorganic compounds such as oxides, nitrides and fluorides of metals and metalloids including silicon, aluminum, titanium, zirconium, tin and magnesium. Specific examples of the inorganic compounds include silicon oxides (SiO$_x$, typically SiO$_2$), aluminum oxide (Al$_2$O$_3$), silicon nitride (Si$_3$N$_4$), silicon oxide nitride (SiO$_x$N$_y$), titanium oxide (TiO$_2$), and indium tin oxide (ITO).

The metal materials can be used as the inorganic layers as metal foils (e.g. aluminum foil) formed by a known method such as rolling by a rolling mill, etc. Alternatively, for instance, a metal material formed in a layer by a known film-forming method such as vacuum vapor deposition, spattering and plating.

The inorganic compound can be typically used as the inorganic layer in a form of thin film formed by a known method. As the method for forming thin film of the inorganic compound, various vapor deposition methods can be used. For instance, physical vapor deposition methods (PVD) such as vacuum vapor deposition, spattering and ion plating, chemical vapor deposition methods (CVD) and like method can be used. The substrate layer may further have a resin layer on top of the vapor deposition layer. For instance, the resin layer may be a topcoat layer provided for purposes such as protecting the vapor deposition layer.

From the standpoint of the moisture resistance, ease of manufacturing, availability, etc., it is preferable to use an inorganic layer formed of, for instance, aluminum or an aluminum alloy. From the standpoint of the moisture resistance, ease of manufacturing, availability, etc., as the inorganic layer formed of an inorganic compound, for instance, a silicon oxide layer or an aluminum oxide layer can be preferably used. Examples of an inorganic layer preferable for being able to form a highly transparent inorganic layer include a silicon oxide layer, an aluminum oxide layer and an ITO layer.

The maximum thickness of the inorganic layer is not particularly limited. From the standpoint of obtaining conformability to shapes of adherends, the inorganic layer advantageously has a thickness of 50 µm or less. From the standpoint of reducing the thickness and weight of the PSA sheet, the thickness of the inorganic layer is suitably 15 µm or less, preferably 13 µm or less, more preferably 11 µm or less, or yet more preferably 9 µm or less. When the substrate layer includes several inorganic layers, the combined thickness of these inorganic layers is in these ranges. The minimum thickness of the inorganic layer is not particularly limited and can be suitably selected so as to obtain a PSA sheet that shows moisture resistance suited for the purpose and usage. The thickness of the inorganic layer is suitably 1 nm or greater. From the standpoint of the moisture resistance, air-tight properties, etc., it is preferably 2 nm or greater, or more preferably 5 nm or greater. When the substrate layer includes several inorganic layers, it is preferable that at least one of them has a thickness in these ranges. Each of the several inorganic layers may have a thickness in these ranges as well.

The preferable thickness range of the inorganic layer may also vary depending on the material of the inorganic layer, the formation method, etc. For instance, when metal foil (e.g. aluminum foil) forms the inorganic layer (or the metal layer), in view of the moisture resistance, ease of manufacturing, crease resistance, etc., its thickness is suitably 1 µm or greater, preferably 2 µm or greater, or more preferably 5 µm or greater. In view of the flexibility which leads to adherend conformability, the metal layer's thickness is suitably 50 µm or less, preferably 20 µm or less, more preferably 15 µm or less, yet more preferably 12 µm or less, or particularly preferably 10 µm or less. With respect to the inorganic layer formed by vapor deposition of an inorganic compound, in view of the balance between flexibility and ease of manufacturing the substrate layer, its thickness is suitably in a range between 1 nm and 1000 nm, preferably in a range between 2 nm and 300 nm, or more preferably in a range between 5 nm and less than 100 nm.

The substrate layer disclosed herein may include a resin layer in addition to the inorganic layer. The resin layer may serve as a protection layer to prevent the inorganic layer from getting damaged by bending deformation and friction. Thus, the substrate layer including the resin layer in addition to the inorganic layer is preferable from the standpoint of the endurance and reliability of moisture-resistant properties and also from the standpoint of the ease of handling the substrate layer or the PSA sheet. By placing the resin layer on the PSA layer side surface of the substrate layer, the anchoring of the PSA layer can be enhanced. When the inorganic layer is formed by vapor deposition, spattering or like method, the resin layer can be used as the base for forming the inorganic layer.

The structure of the resin layer is not particularly limited. For instance, the resin layer may include a void space as in fiber assemblies such as woven fabrics and non-woven fabrics or as in foam bodies such as polyethylene foam; or it can be a resin layer (resin film) essentially free of a void space. From the standpoint of reducing the thickness of the PSA sheet, it is preferable use a resin layer essentially free of a void space.

As the resin material forming the resin layer, it is possible to use, for instance, polyester resins such as polyethylene terephthalate (PET), polybutylene terephthalate (PBT) and polyethylene naphthalate (PEN); polyolefin resins such as polyethylene (PE) and polypropylene (PP); polyimide (PI); polyetheretherketone (PEEK); chlorine-containing polymers such as polyvinyl chloride (PVC) and polyvinylidene chloride; polyamide-based resins such as nylon and aramid; polyurethane resin; polystyrene-based resin; acrylic resins; fluororesins; cellulose-based resins; and polycarbonate-based resins. Of these, solely one species or a combination of two or more species can be used. When two or more species of resin are used together, these resins can be used blended or separately. Both thermoplastic resins and thermosetting resins can be used. From the standpoint of the ease of forming film, etc., a thermoplastic resin is preferably used.

In the substrate layer including a resin layer, at an edge face of the PSA sheet, water vapor may enter the resin layer from its side (lateral surface). From the standpoint of inhibiting such entrance of water vapor, as the resin material forming the resin layer, a highly moisture-resistant material can be preferably used. For instance, a preferable resin layer is formed, using a resin material whose primary component is a polyester resin such as PET or a polyolefinic resin such as PE and PP. In a preferable embodiment, PET film can be preferably used as the resin layer. In another preferable embodiment, as the resin layer, it is preferable to use BOPP (biaxially oriented polypropylene) film obtainable by forming film of a resin material that comprises PP as the primary component and biaxially stretching the film. In the PSA sheet having no inorganic layer further on the adherend side relative to the resin layer, it is particularly significant to inhibit entrance of water vapor from the lateral surface of the resin layer. A typical example of the PSA sheet having such a constitution is a PSA sheet in which the PSA layer-side surface of the substrate layer is formed with a resin layer.

The resin layer may include, as necessary, various additives such as fillers (inorganic fillers, organic fillers, etc.), anti-aging agent, antioxidant, UV absorber, anti-static agent, slip agent and plasticizer. The ratio of the various additives included is below about 30% by weight (e.g. below 20% by weight, typically below 10% by weight).

The number of resin layers in the substrate layer is not particularly limited and it can be one, two or more (e.g. about two to five). From the standpoint of the ease of manufacturing and availability, the number of resin layers in the substrate layer is preferably one to three, or more preferably one or two. When the substrate layer includes several resin layers, the materials and structures (thicknesses, inclusion of a void space, etc.) of these resin layers can be the same with or different from one another.

The method for forming the resin layer is not particularly limited. A heretofore known general resin film molding method can be suitably employed to form the resin layer, for instance, extrusion molding, inflation molding, T-die casting, calender roll molding and wet casting. The resin layer may a non-stretched kind or may be subjected to a stretching process such as uni-axial stretching and bi-axial stretching.

The minimum thickness of the resin layer is not particularly limited. From the standpoint of the crease resistance, ease of forming film, etc., the thickness of the resin layer is suitably 1 µm or greater, preferably 3 µm or greater, more preferably 5 µm or greater, or yet more preferably 7 µm or greater. When the substrate layer includes several resin layers, it is preferable that at least one of them has a thickness in these ranges. Each of the several resin layers may have a thickness in these ranges as well.

The maximum thickness of the resin layer is not particularly limited. For instance, it can be 100 µm or less. From the standpoint of reducing the thickness and weight of the PSA sheet, the thickness of the resin layer is suitably 70 µm or less, preferably 55 µm or less, or more preferably 35 µm or less. When the substrate layer includes several resin layers, the combined thickness of these resin layers is preferably in these ranges. In general, the moisture permeability of the resin layer is higher than that of the inorganic layer. Thus, it is also preferable to make the combined thickness of resin layers smaller from the standpoint of preventing water vapor from entering the resin layer from its lateral surface.

The inorganic layer and the resin layer are preferably bonded. The bonding method is not particularly limited. A method known in the pertinent field can be suitably employed. For instance, it is possible to employ a method (extrusion lamination) where a resin material for forming the resin layer is melted and extruded along with a pre-molded inorganic layer (typically metal foil), a method where a solution or dispersion of the resin material for forming the resin layer is applied to a pre-molded inorganic layer and allowed to dry, and like method. Alternatively, it is also possible to employ a method where an inorganic layer is vapor-deposited on a pre-molded resin layer, a method where an inorganic layer is bonded to a separately-molded resin layer, and like method. For instance, the bonding can be achieved by hot pressing. The resin layer and the inorganic layer can be bonded via an adhesive layer or a PSA layer.

The adhesive layer to bond the resin layer and the inorganic layer can be an undercoat layer formed by applying an undercoat such as primer to the resin layer. As the undercoat, those known in the pertinent field can be used, such as urethane-based undercoat, ester-based undercoat, acrylic undercoat, and isocyanate-based undercoat. From the standpoint of reducing the thickness and weight of the PSA sheet, the thickness of the undercoat layer is suitably 7 µm or less, preferably 5 µm or less, or more preferably 3 µm or less. The minimum thickness of the undercoat layer is not particularly limited. For instance, it can be 0.01 µm or greater (typically 0.1 µm or greater).

Before the bonding process, the resin layer may be subjected to common surface treatment, chemical or physical treatment, for instance, mattifying treatment, corona discharge treatment, crosslinking treatment, chromic acid treatment, ozone exposure, flame exposure, high-voltage electric shock exposure, and ionized radiation treatment.

The PSA layer(s) placed between layers forming the substrate layer to bond them together are not exposed to the surface of the PSA sheet; and therefore, they do not correspond to the PSA layer forming the adhesive face of the PSA sheet. In the PSA sheet disclosed herein, the material and physical properties of such a PSA layer for internal use in the substrate layer are not particularly limited. The PSA layer can be formed of a PSA similar to the PSA layer forming the adhesive face or can be formed of a different PSA. It is not particularly limited in thickness, either. For instance, it may have a comparable thickness to the undercoat layer.

Favorable examples of the substrate layer used in the PSA sheet disclosed herein include a substrate layer formed of a laminate body that comprises an inorganic layer as well as first and second resin layers laminated on top and bottom of the inorganic layer. The first and second resin layers forming the substrate layer are laminated on top and bottom of the inorganic layer. As long as such a layer order can be obtained, the first and second resin layers may be in direct contact with the inorganic layer or they may be placed via undercoat layers as described above to obtain tight adhesion between themselves and the inorganic layer. In the PSA sheet disclosed herein, the first resin layer refers to the resin layer placed on the backside (the front face of the substrate layer) of the PSA sheet relative to the inorganic layer and the second resin layer refers to the resin layer placed on the PSA layer side.

The inorganic layer can be a metal layer formed of an aforementioned metal material. For instance, an aluminum layer is preferable. The first and second resin layers are preferably formed from the same material. For instance, thermoplastic resins exemplified above can be used. Of these materials, solely one species or a combination of two or more species can be used. Each of the first and second resin layers may have a layered structure with two or more layers, but is preferably a monolayer. In particular, preferable materials forming the first and second resin layers include PET, PP and polystyrene. PET and PP are more preferable.

The first and second resin layers have thicknesses $T_{R1}$ and $T_{R2}$, respectively; and their ratio ($T_{R1}/T_{R2}$) is not particularly limited, but is suitably 0.5 or greater, preferably 1 or greater, more preferably 1.5 or greater, or yet more preferably 2.0 or greater. The $T_{R1}/T_{R2}$ ratio is suitably about 10 or less, preferably 7.0 or less, more preferably 5.0 or less, or yet more preferably 4.0 or less. When the $T_{R1}/T_{R2}$ ratio is in these ranges, adherend conformability and crease resistance can be preferably combined. The thickness $T_{R1}$ of the first resin layer is suitably about 10 μm or greater, preferably 15 μm or greater, more preferably 18 μm or greater, or yet more preferably 20 μm or greater (e.g. 22 μm or greater). $T_{R1}$ is suitably about 100 μm or less, preferably 70 μm or less, more preferably 60 μm or less, yet more preferably 50 μm or less, or particularly preferably 35 μm or less. The thickness $T_{R2}$ of the second resin layer is suitably about 1 μm or greater, preferably 3 μm or greater, more preferably 5 μm or greater, or yet more preferably 7 μm or greater. $T_{R2}$ is suitably about 25 μm or less, preferably 20 μm or less, more preferably 15 μm or less, or yet more preferably 12 μm or less (e.g. 10 μm or less).

The inorganic layer has a thickness $T_I$ and the first and second resin layers have a combined thickness $T_R(=T_{R1}+T_{R2})$; and their ratio ($T_R/T_I$) is not particularly limited. From the standpoint of preventing creases, protecting the inorganic layer, etc., the ratio is suitably 1 or greater, preferably 2 or greater, more preferably 3 or greater, or yet more preferably 4 or greater. When it is bent and applied to accommodate the adherend shape, in view of the adherend conformability, the $T_R/T_I$ ratio is suitably 10 or less, preferably 8 or less, or more preferably 6 or less. The total ($T_R$) of the first and second resin layers' thicknesses $T_{R1}$ and $T_{R2}$ is suitably about 15 μm or greater, preferably 20 μm or greater, more preferably 25 μm or greater, or yet more preferably 30 μm or greater. $T_R$ is suitably about 100 μm or less, preferably 80 μm or less, more preferably 70 μm or less, or yet more preferably 60 μm or less (e.g. 50 μm or less). The substrate layer in this embodiment can effectively protect the inorganic layer (e.g. an aluminum layer) as thin film from bending, creasing, breaking, etc. By this, even when the PSA sheet is exposed to various stressors in the manufacturing process, etc., or even when it is exposed to a harsh environment for a long period while in use, it can securely maintain the properties as the moisture-resistant film.

As the method for forming a laminate body having the inorganic layer, first resin layer and second resin layer, it is possible to employ various methods as described earlier, such as a method where the respective layers are formed as films by a known method and they are laminated dry by forming undercoat layers described above, a method where the inorganic layer is formed on the first resin layer in a tightly bonded manner and the second resin layer is laminated dry or extrusion-laminated on top of it, and like method.

The minimum thickness of the substrate layer is not particularly limited. From the standpoint of the ease of manufacturing and handling the PSA sheet, the thickness of the substrate layer is about 3 μm or greater, or suitably about 5 μm or greater (e.g. 10 μm or greater). To obtain moisture resistance and rigidity unsusceptible to creasing, it is desirable that the substrate layer is thick. From such a standpoint, the thickness of the substrate layer is preferably 15 μm or greater, more preferably 20 μm or greater, yet more preferably 30 μm or greater, or particularly preferably 40 μm or greater. The maximum thickness of the substrate layer is not particularly limited, either. It is about 1 mm or less, or suitably about 300 μm or less (e.g. 150 μm or less). From the standpoint of the adherend conformability of the PSA sheet and of reducing its thickness and weight, the thickness of the substrate layer is preferably 100 μm or less, more preferably 80 μm or less, yet more preferably 70 μm or less, or particularly preferably 65 μm or less (e.g. 55 μm or less). The substrate layer with such a limited thickness is less likely to lead to formation of a space between the adherend and the PSA sheet; and therefore, it can prevent water vapor permeation through the space.

The PSA layer side surface of the substrate layer may be subjected to common surface treatment, chemical or physical treatment, for instance, mattifying treatment, corona discharge treatment, crosslinking treatment, chromic acid treatment, ozone exposure, flame exposure, high-voltage electric shock exposure, and ionized radiation treatment. On the PSA layer-side surface of the substrate layer, an undercoat layer may be placed, which is formed by applying an undercoat such as primer to the resin layer. As the undercoat, those known in the pertinent field can be used, such as urethane-based, ester-based, acrylic, and isocyanate-based kinds. From the standpoint of reducing the thickness and weight of the PSA sheet, the thickness of the undercoat layer is suitably 7 μm or less, preferably 5 μm or less, or more preferably 3 μm or less.

<Release Liner>

In the art disclosed herein, a release liner can be used during formation of the PSA layer; fabrication of the PSA sheet; storage, distribution and shape machining of the PSA sheet prior to use, etc. The release liner is not particularly limited. For example, a release liner having a release layer on the surface of a liner substrate such as resin film and paper; a release liner formed from a low adhesive material such as a fluoropolymer (polytetrafluoroethylene, etc.) or a polyolefinic resin (PE, PP, etc.); or the like can be used. The release layer can be formed, for instance, by subjecting the liner substrate to a surface treatment with a release agent such as a silicone-based, long-chain alkyl-based, fluorine-based, or molybdenum disulfide-based release agent. When the PSA sheet is used as a sealing material for a magnetic disc device, it is preferable to use a non-silicone-based release liner free of a silicone-based release agent which may produce siloxane gas.

<Applications>

The PSA sheet disclosed herein can bring about both high-temperature bonding reliability and reduction of outgassing; and therefore, it is preferably used in various applications for which gas contamination is desirably limited while increases in internal temperature are expected. For instance, the PSA sheet disclosed herein is preferably used for various electronic devices. More specifically, it is preferably used as a wrapping material (e.g. a sealing material to seal its internal space) in the electronic devices. In a preferable embodiment, for instance, the PSA sheet is preferably used for sealing the internal space of a magnetic disc device such as HDD. In this application, an included gas such as siloxane may cause damage to the device; and therefore, it is important to prevent such gas contamination. The PSA sheet according to a preferable embodiment disclosed herein shows great moisture resistance, which can be an advantageous property in the application. In particular, for instance, in a magnetic disc device employing HAMR, it is important to prevent entrance of water which badly affects the recording life. By using the PSA sheet disclosed herein for such a purpose (i.e. for use as a sealing material (or a cover seal) for HAMR magnetic disc device), a magnetic recording device having a higher density can be obtained.

FIG. 4 shows an embodiment of the magnetic disc device as a favorable example to which the art disclosed herein can be applied. FIG. 4 shows a cross-sectional diagram schematically illustrating the magnetic disc device according to an embodiment. A magnetic disc device 100 comprises a data-recording magnetic disc 110, a spindle motor 112 that rotates magnetic disc 110, a magnetic head 114 that reads and writes data on magnetic disc 110, and an actuator 116 that supplies power to magnetic head 114. Actuator 116 has a built-in linear motor not shown in the drawing. In this example of constitution, two magnetic discs 110 are included, but it is not limited to this and three or more magnetic discs may be included.

These components of magnetic disc device 100 are placed in a housing 120 which serves as a casing for magnetic disc device 100. In particular, the components of magnetic disc device 100 are contained in a box-shaped housing base member (a support structure) 122 having a top opening and the top opening of housing base member 122 is covered with a rigid cover member 124. More specifically, the top opening of housing base member 122 has a recessed portion around the inner circumference and the outer rim of cover member 124 is placed on the bottom of recessed portion 126, with cover member 124 covering the opening. A PSA sheet 101 is applied from the top face of cover member 124 so as to entirely cover the cover member 124 and the top face (outer circumference of the opening) of housing 120, that is, the entire top face of housing 120, altogether. This seals a space 140 present between housing base member 122 and cover member 124 as well as other holes and void spaces that communicate from the inside to the outside of magnetic disc device 100, thereby keeping the inside of the device air-tight. Such a sealing structure using PSA sheet 101 as the sealing material (cover seal) can be made thinner than a conventional counterpart that uses a cover member and a gasket to obtain air-tight properties. In addition, because it does not require the use of a liquid gasket, outgassing from the gasket can be eliminated as well. In this embodiment, the width of the top rim (face of the frame) of housing base member 122 is about 0.1 mm to 5 mm (e.g. 3 mm or less, or even 2 mm or less) at its narrowest portion, with the width being the distance between the outer circumference and inner circumference of the top rim of housing base member 122. When PSA sheet 101 is applied as a cover seal to the top face of housing base member 122, the top rim of housing base member 122 provides a bonding surface to PSA sheet 101, forming a portion that isolates the internal space of magnetic disc device 100 from the outside. According to the art disclosed herein, even in an application where the width of bonding surface (through-bonding-plane permeation distance) is limited, the internal space can be maintained air-tightly and dry (moisture-resistant).

FIG. 5 shows another embodiment of the magnetic disc device to which the art disclosed herein can be applied. A magnetic disc device 200 has basically the same constitution as the embodiment described above except for the way a PSA sheet 201 is applied. Different features are described below. In magnetic disc device 200, PSA sheet 201 covers cover member 224 and the top face (outer circumference of the opening) of housing base member 222 altogether, having a margin (or an extending portion) that further extends to the side of housing 220. In particular, the extending portion is bent from the top face over the corner of top rim to the side of housing base member 222. The extending portion may be provided entirely or partially at each side forming the outer circumference of the top face of housing 220. In other words, in magnetic disc device 200, PSA sheet 201 is applied, at least partially covering the top and side faces of housing 220 in a U shape. Similar to PSA sheet 101 according to the embodiment described above, PSA sheet 201 seals a space 240 present between housing base member 222 and cover member 224 as well as other holes and void spaces that communicate from the inside to the outside of magnetic disc device 200; and because it is applied with a margin extending to the side of housing base member 222, the sealed state is extended in the in-plane direction of bonding area. This results in a larger distance (width) of the bonding area of PSA sheet 201 separating the outside and space 240, etc., and it inhibits moisture permeation via the bonding area of PSA sheet 201, thereby further enhancing the moisture resistance. In this embodiment, the distance of PSA sheet 201 extending from the top rim (top edge of the side) to the side of housing 220 (i.e. the length of PSA sheet 201 that covers the side (lateral surface)) is about 1 mm or greater (e.g. 2 mm or greater, or even 3 mm or greater).

In these embodiments, cover members 124 and 224 cover magnetic discs 110 and 210 as well as actuators 116 and 216 altogether, respectively, in one piece. However, they are not limited to these. They may cover magnetic discs 110 and 210, actuators 116 and 216, and other components, separately; or they may not cover actuators 116 or 216 while covering magnetic discs 110 and 210. Even in these embodiments, by applying the PSA sheet over the cover member, the inside of the device can be made moisture-resistant and air-tight. In a magnetic disc device having such an embodiment, the moisture resistance and air-tight properties are obtained with the thin PSA sheet, thereby achieving a thin sealing structure. This can increase the capacity for housing magnetic discs, bringing about a magnetic disc device having a higher density and a larger capacity.

Matters disclosed by this description include the following:

(1) A magnetic disc device comprising
at least one data-recording magnetic disc,
a motor that rotates the magnetic disc,
a magnetic head that at least either reads or writes data on the magnetic disc,
an actuator that moves the magnetic head, and
a housing that houses the magnetic disc, the motor, the magnetic head and the actuator; wherein
the housing is provided with a cover seal, the cover seal being a PSA sheet comprising a substrate layer and a PSA layer provided to one face of the substrate layer; and
the PSA sheet exhibits a 180° peel strength of 1 N/20 mm or greater to stainless steel at 60° C., and
has an amount of thermally release gas of 10 µg/cm$^2$ or less, determined at 130° C. for 30 minutes by gas chromatography/mass spectrometry
(2) The magnetic disc device according to (1) above, wherein the housing comprises a box-shaped housing base member having a top opening and a cover member to cover the opening.
(3) The magnetic disc device according to (2) above, wherein the housing base member has a recessed portion around the inner circumference of the top opening and the outer rim of the cover member is placed on the bottom of the recessed portion.
(4) The magnetic disc device according to any of (1) to (3) above, wherein the cover member has a hole.
(5) The magnetic disc device according to any of (1) to (4) above, wherein the PSA sheet seals the internal space of the magnetic disc device.
(6) The magnetic disc device according to any of (1) to (5) above, wherein the PSA sheet covers and seals the top face of the housing base member of the magnetic disc device.
(7) The magnetic disc device according to any of (1) to (6) above, capable of heat-assisted magnetic recording.
(8) A PSA sheet comprising a substrate layer and a PSA layer provided to one face of the substrate layer, exhibiting a 180° peel strength of 1 N/20 mm or greater to stainless steel at 60° C., and having an amount of thermally released gas of 10 µg/cm$^2$ or less, determined at 130° C. for 30 minutes by gas chromatography/mass spectrometry.
(9) The PSA sheet according to (8) above, wherein the 180° peel strength to stainless steel at 60° C. is 2 N/20 mm or greater.
(10) The PSA sheet according to (8) or (9), wherein the PSA layer comprises a styrene-based block copolymer.
(11) The PSA sheet according to (10) above, wherein the styrene-based block copolymer is at least one species selected from the group consisting of styrene-isoprene block copolymers, styrene-butadiene block copolymers, and hydrogenation products thereof.
(12) The PSA sheet according to any of (8) to (11) above, wherein the PSA layer has a thickness of 20 µm or less.
(13) The PSA sheet according to any of (8) to (12) above, wherein the substrate layer comprises a moisture-impermeable layer having a moisture permeability (a water vapor transmission rate in the thickness direction) below $5\times10^{-1}$ g/m$^2$·24 h, determined at 40° C. at 90% RH based on the MOCON method (JIS K7129:2008).
(14) The PSA sheet according to any of (8) to (13) above, showing a displacement less than 2 mm in a shear holding power test carried out with a 1 kg load at 60° C. for one hour.
(15) The PSA sheet according to any of (8) to (14) above, having a moisture permeability lower than 90 µg/cm$^2$·24 h in the in-plane direction of bonding area of PSA sheet, determined at a permeation distance of 2.5 mm based on the MOCON method.
(16) The PSA sheet according to any of (8) to (15) above, used for sealing the internal space of a magnetic disc device.
(17) A release liner supported PSA sheet comprising the PSA sheet according to any of (8) to (16) above and a release liner protecting the adhesive face of the PSA sheet, wherein the release liner is a non-silicone-based release liner free of a silicone-based release agent.
(18) A magnetic disc device comprising the PSA sheet according to any of (8) to (15) above.
(19) The magnetic disc device according to (18) above, wherein the PSA sheet seals the internal space of the magnetic disc device.
(20) The magnetic disc device according to (18) or (19) above, wherein the magnetic disc device has a housing base member and the PSA sheet is a cover seal that covers seals the top face of the housing base member.
(21) The magnetic disc device according to any of (18) to (20) above, capable of heat-assisted magnetic recording.

EXAMPLES

Several working examples related to the present invention are described below, but the present invention is not intended to be limited to these examples. In the description below, "parts" and "%" are by weight unless otherwise specified.

<<Experiment 1>>

In Experiment 1, with respect of evaluation items including high-temperature bonding reliability and amounts of thermally released gas, influences of polymer species in PSA were studied.

Example 1

(Preparation of Substrate Layer)

By dry bonding lamination, were laminated 25 µm thick PET film (PET layer) as the first resin layer, 7 µm thick aluminum foil (Al layer) as the inorganic layer and 9 µm thick PET film (PET layer) as the second resin layer in this order from the front (outer surface side) to the backside (PSA layer side). Between each resin layer and the inorganic layer, was laminated a 3 µm thick adhesive layer. A 47 µm thick substrate layer (moisture-impermeable layer) was thus prepared.

(Fabrication of PSA Sheet)

In toluene, was dissolved a hydrogenated styrene-isoprene-styrene block copolymer (SIPS; product name 2563NS available from Soken Chemical & Engineering Co., Ltd.; Mw≈24×10$^4$, Mw/Mn≈2.0, 11% styrene) as the base polymer to prepare a PSA composition with 25% NV. The PSA composition was applied to one face (the second resin layer-side surface) of the substrate layer to have a thickness of 30 µm after dried, and allowed to dry at 120° C. for 3 minutes to form a PSA layer. A PSA sheet was thus obtained according to this Example. For protection of the surface (adhesive face) of the PSA layer, was used a release liner formed of thermoplastic film treated with release agent (product name HP-S0 available from Fujico Co., Ltd.; 50 µm thick).

Example 2

As the PSA, was used a PSA tape VR5300 (rubber-based PSA whose primary component is styrene-isoprene-styrene block copolymer (SIS), 10% styrene) available from Nitto Denko Corporation). Otherwise in the same manner as Example 1, was obtained a PSA sheet according to Example 2.

Examples 3 and 4

In place of SIPS, were used polyisobutylene (PIB; product name Oppanol N50 available from BASF Corporation, $Mw \approx 34 \times 10^4$, $Mw/Mn \approx 5.0$) in Example 3 and butyl rubber (IIR; product name JSR BUTYL 268 available from JSR Corporation, $Mw \approx 54 \times 10^4$, $Mw/Mn \approx 4.5$). Otherwise in the same manner as Example 1, were obtained PSA sheets according to Examples 3 and 4.

[Moisture Permeability (Cup Method) of PSA Layer]

The moisture permeability in the thickness direction of each PSA layer was determined based on the water vapor permeability test (cup method) in JIS Z 0208. In particular, the PSA composition was applied to a releasable surface and allowed to dry to form a 50 µm thick PSA layer. The PSA layer was adhered to 2 µm thick PET film (DIAFOIL available from Mitsubishi Plastics, Inc.) with a rubber roller. The PET layer-supported PSA layer was cut to a circle of 30 mm diameter to fit the diameter of the test cup (an aluminum cup of 30 mm diameter used in the cup method of JIS Z 0208). This was used as a test sample. A prescribed amount of calcium chloride was placed in the cup and the opening of the cup was sealed with the test sample prepared above. The cup covered with the test sample was placed in a thermostat wet chamber at 60° C. and 90% RH and left standing for 24 hours. The change in weight of calcium chloride before and after this step was determined to obtain the moisture permeability ($g/cm^2 \cdot 24$ h).

For each Example, Table 1 shows the species of PSA as well as the test results of moisture permeability (cup method) ($g/cm^2 \cdot 24$ h), storage moduli G'(25° C.) (MPa) and G'(60° C.) (MPa), through-bonding-plane moisture permeability of PSA sheet ($\mu g/cm^2 \cdot 24$ h), adhesive strength at room temperature (N/20 mm), adhesive strength at 60° C. (N/20 mm), shear holding power (mm) and amount of thermally released gas ($\mu g/cm^2$).

TABLE 1

|  | Ex. 1 | Ex. 2 | Ex. 3 | Ex. 4 |
|---|---|---|---|---|
| PSA | SIPS | SIS | PIB | IIR |
| G' (25° C.) of PSA layer (MPa) | 0.11 | 0.21 | 0.28 | 0.25 |
| G' (60° C.) of PSA layer (MPa) | 0.06 | 0.14 | 0.20 | 0.23 |
| WVTR (cup method) ($g/cm^2 \cdot 24$ h) | 1.4 | 1.8 | 1.3 | 1.3 |
| Through-bonding-plane WVTR ($\mu g/cm2 \cdot 24$ h) | 21.9 | 13.6 | 28.0 | 30.4 |
| Adhesive strength at 23° C. (N/20 mm) | 10.0 | 28 | 5.5 | 2.6 |
| Adhesive strength at 60° C. (N/20 mm) | 4.2 | 19 | 1.6 | 0.4 |
| Shear holding power (mm) | 0.3 | 0.3 | 0.3 | 0.2 |
| Amount of thermally generate gas ($\mu g/cm^2$) | 11.5 | 10.5 | 0.8 | 0.8 |

WVTR: water vapor transmission rate (moisture permeability)

As shown in Table 1, Examples 1 and 2 using styrene-based block copolymers maintained the 60° C. adhesive strength at a higher level than Examples 3 and 4 using PIB or IIR, indicating their superior high-temperature bonding reliability. In addition, they were found to have a tendency to have low through-bonding-plane moisture permeability. However, Examples 1 and 2 tended to have greater amounts of thermally released gas than the PSA sheets according to Examples 3 and 4.

<<Experiment 2>>

In Experiment 2, the thickness of the PSA layer using the styrene-based block copolymer was changed to study evaluation items including high-temperature bonding reliability and amounts of thermally released gas.

Example 5

The PSA layer was formed to have the thickness shown in Table 2. Otherwise in the same manner as Example 1, was obtained a PSA sheet according to Example 5. Table 2 shows the test results. Table 2 also shows the thickness of the PSA layer of Example 1 as well as the test results thereof.

TABLE 2

|  | Ex. 5 | Ex. 1 |
|---|---|---|
| PSA | SIPS |  |
| G' (25° C.) of PSA layer (MPa) | 0.11 |  |
| G' (60° C.) of PSA layer (MPa) | 0.06 |  |
| Thickness of PSA layer (µm) | 10 | 30 |
| WVTR (cup method) ($g/cm^2 \cdot 24$ h) | 1.4 | 1.4 |
| Through-bonding-plane WVTR ($\mu g/cm2 \cdot 24$ h) | 30.0 | 21.9 |
| Adhesive strength at 23° C. (N/20 mm) | 8.0 | 10.0 |
| Adhesive strength at 60° C. (N/20 mm) | 3.1 | 4.2 |
| Shear holding power (mm) | 0.3 | 0.3 |
| Amount of thermally generate gas ($\mu g/cm^2$) | 3.8 | 11.5 |

WVTR: water vapor transmission rate (moisture permeability)

As shown in Table 2, by limiting the thickness of the PSA layer, the amount of thermally released gas was reduced while maintaining the 60° C. adhesive strength at or above a certain level. In particular, in Example 5 having a 10 µm thick PSA layer, the amount of thermally released gas was reduced to or below 10 $\mu g/cm^2$ (more specifically to or below 5 $\mu g/cm^2$) while maintaining the 60° C. adhesive strength at or above 1 N/20 mm (more specifically at or above 2 N/20 mm). These results indicate that the art disclosed herein provides a PSA sheet that brings about both high-temperature bonding reliability and reduction of outgassing.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST 1, 101, 201 PSA sheets
10 substrate layer
12 first resin layer
14 inorganic layer
16 second resin layer
20 PSA layer
50 moisture permeability tester
52 wet chamber
54 dry chamber
56 metal plate
58 opening (in metal plate)
60 measurement sample
100, 200 magnetic disc devices
110, 210 magnetic discs
112, 212 spindle motors
114, 214 magnetic heads
116, 216 actuator
120, 220 housing
122, 222 housing base member 124, 224 cover member
126, 226 recessed portions
140, 240 spaces

What is claimed is:

1. A magnetic disc device comprising
at least one data-recording magnetic disc,
a motor that rotates the magnetic disc,
a magnetic head that at least either reads or writes data on the magnetic disc,
an actuator that moves the magnetic head, and
a housing that houses the magnetic disc, the motor, the magnetic head and the actuator;
wherein
the housing is provided with a cover seal,
the cover seal is a pressure-sensitive adhesive sheet comprising a substrate layer and a pressure-sensitive adhesive layer provided to one face of the substrate layer, and
the pressure-sensitive adhesive sheet exhibits a 180° peel strength of 1 N/20 mm or greater to stainless steel at 60° C. and has an amount of thermally release gas of 10 µg/cm² or less, determined at 130° C. for 30 minutes by gas chromatography/mass spectrometry.

2. The magnetic disc device according to claim 1, wherein the housing comprises a box-shaped housing base member having a top opening and a cover member to cover the opening.

3. The magnetic disc device according to claim 2, wherein the housing base member has a recessed portion inner-circumferentially around the top opening and the cover member has an outer rim placed on the bottom of the recessed portion.

4. The magnetic disc device according to claim 2, wherein the cover member has a hole.

5. The magnetic disc device according to claim 2, wherein the pressure-sensitive adhesive sheet covers and seals the top face of the housing base member of the magnetic disc device.

6. The magnetic disc device according to claim 1, wherein the pressure-sensitive adhesive sheet seals the internal space of the magnetic disc device.

7. The magnetic disc device according to claim 1, capable of heat-assisted magnetic recording.

8. A pressure-sensitive adhesive sheet comprising a substrate layer and a pressure-sensitive adhesive layer provided to one face of the substrate layer,
the pressure-sensitive adhesive sheet exhibiting a 180° peel strength of 1 N/20 mm or greater to stainless steel at 60° C. and having an amount of thermally released gas of 10 µg/cm² or less, determined at 130° C. for 30 minutes by gas chromatography/mass spectrometry.

9. The pressure-sensitive adhesive sheet according to claim 8, wherein the 180° peel strength to stainless steel at 60° C. is 2 N/20 mm or greater.

10. The pressure-sensitive adhesive sheet according to claim 8, wherein the pressure-sensitive adhesive layer comprises a styrene-based block copolymer.

11. The pressure-sensitive adhesive sheet according to claim 10, wherein the styrene-based block copolymer is at least one species selected from the group consisting of styrene-isoprene block copolymers, styrene-butadiene block copolymers, and hydrogenation products thereof.

12. The pressure-sensitive adhesive sheet according to claim 8, wherein the pressure-sensitive adhesive layer has a thickness of 20 µm or less.

13. The pressure-sensitive adhesive sheet according to claim 8, wherein the substrate layer comprises a moisture-impermeable layer having a moisture permeability (a water vapor transmission rate in its thickness direction) below $5 \times 10^{-1}$ g/m²·24 h, determined at 40° C. at 90% RH based on the MOCON method (JIS K7129:2008).

14. The pressure-sensitive adhesive sheet according to claim 8, showing a displacement less than 2 mm in a shear holding power test carried out with a 1 kg load at 60° C. for one hour.

15. The pressure-sensitive adhesive sheet according to claim 8, having a moisture permeability lower than 90 µg/cm²·24 h in the in-plane direction of bonding area of pressure-sensitive adhesive sheet, determined at a permeation distance of 2.5 mm based on the MOCON method.

16. The pressure-sensitive adhesive sheet according to claim 8, used for sealing the internal space of a magnetic disc device.

17. A release liner-supported pressure-sensitive adhesive sheet comprising the pressure-sensitive adhesive sheet according to claim 8 and a release liner protecting the adhesive face of the pressure-sensitive adhesive sheet, wherein the release liner is a non-silicone-based release liner free of a silicone-based release agent.

18. A magnetic disc device comprising the pressure-sensitive adhesive sheet according to claim 8.

19. The magnetic disc device according to claim 18, wherein the pressure-sensitive adhesive sheet seals the internal space of the magnetic disc device.

20. The magnetic disc device according to claim 18, wherein the magnetic disc device has a housing base member and the pressure-sensitive adhesive sheet is a cover seal that covers and seals the top face of the housing base member.

* * * * *